United States Patent
Sakaguchi

(10) Patent No.: US 10,065,492 B2
(45) Date of Patent: Sep. 4, 2018

(54) VEHICLE BOTTOM STRUCTURE

(71) Applicant: TOYOTA JIDOSHA KABUSHIKI KAISHA, Toyota (JP)

(72) Inventor: Naoya Sakaguchi, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/822,656

(22) Filed: Nov. 27, 2017

(65) Prior Publication Data
US 2018/0147930 A1     May 31, 2018

(30) Foreign Application Priority Data
Nov. 30, 2016 (JP) ................... 2016-232933

(51) Int. Cl.
*B60K 1/04* (2006.01)
*B60L 11/18* (2006.01)
*B60S 5/06* (2006.01)

(52) U.S. Cl.
CPC ............ *B60K 1/04* (2013.01); *B60L 11/1877* (2013.01); *B60S 5/06* (2013.01); *B60K 2001/0416* (2013.01); *B60K 2001/0494* (2013.01)

(58) Field of Classification Search
CPC ..... B60K 1/04; B60S 9/14; B60S 5/06; B60S 9/02
See application file for complete search history.

(56) References Cited

U.S. PATENT DOCUMENTS

| 4,495,787 A * | 1/1985 | Comstock ............... B60R 16/04 248/553 |
| 6,290,013 B1 * | 9/2001 | Bienenstein, Jr. ...... B60R 16/04 180/68.5 |
| 9,352,728 B2 * | 5/2016 | Corfitsen ............ B60L 11/1822 |
| 2008/0000703 A1 * | 1/2008 | Shindou .................... B60K 1/04 180/68.5 |
| 2009/0044997 A1 * | 2/2009 | Picavet ................... B60R 16/04 180/68.5 |
| 2013/0052501 A1 * | 2/2013 | Oyama ............... H01M 2/1083 429/96 |

FOREIGN PATENT DOCUMENTS

| JP | 2001-151156 | 6/2001 |
| JP | 2008-37135 | 2/2008 |

* cited by examiner

*Primary Examiner* — John Daniel Walters
*Assistant Examiner* — James J Triggs
(74) *Attorney, Agent, or Firm* — Oblon, McClelland, Maier & Neustadt, L.L.P.

(57) ABSTRACT

A vehicle bottom structure includes a floor panel, a battery mounted on the floor panel, a deck board, and an inclined portion. The inclined portion is arranged adjacent to the battery. The inclined portion is inclined such that, in a direction parallel to a mounting surface of the floor panel, the inclined portion rises as a distance from the battery increases. The inclined portion includes an end facing the battery. The end is located above a lower surface of the battery and below half the height of the battery.

5 Claims, 4 Drawing Sheets

VEHICLE BOTTOM STRUCTURE

BACKGROUND OF THE INVENTION

The present invention relates to a vehicle bottom structure.

The vehicle bottom structure of Japanese Laid-Open Patent Publication No. 2008-037135 has a pair of rear side members extending in the vehicle longitudinal direction. A plate-shaped rear floor panel is fixed between the pair of rear side members. The rear floor panel has a downward recess in a center portion in the vehicle width direction. A battery holder is attached to the bottom of the recess. A battery is attached to the upper surface of the battery holder. Also, a plate-shaped deck board is arranged above the rear floor panel. The battery is located in the space between the rear floor panel and the deck board.

In order to remove the battery attached to the rear floor panel of the vehicle, it is necessary to lift the battery above the deck board. However, vehicle batteries generally have a considerable weight. Thus, when the operator lifts up and removes the battery, a considerable physical burden is imposed on the operator. The vehicle bottom structure described in the above publication is not designed to reduce the physical burden imposed on the operator when the battery is removed, and there is still room for improvement.

SUMMARY OF THE INVENTION

To achieve the foregoing objective and in accordance with one aspect of the present invention, a vehicle bottom structure is provided that includes a floor panel, a battery, a plate-shaped deck board, and an inclined portion. The floor panel constitutes a floor surface of a vehicle and has a mounting surface on which a battery is mounted. The battery mounted on the mounting surface of the floor panel. The plate-shaped deck board is located above the floor panel and the battery. The inclined portion is arranged adjacent to the battery and guides the battery when the battery is removed. The inclined portion is inclined such that, in a direction parallel to the mounting surface of the floor panel, the inclined portion rises as a distance from the battery increases. The inclined portion includes an end facing the battery, wherein the end is located above a lower surface of the battery and below half a height of the battery.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1 to 4.

Figure 1:
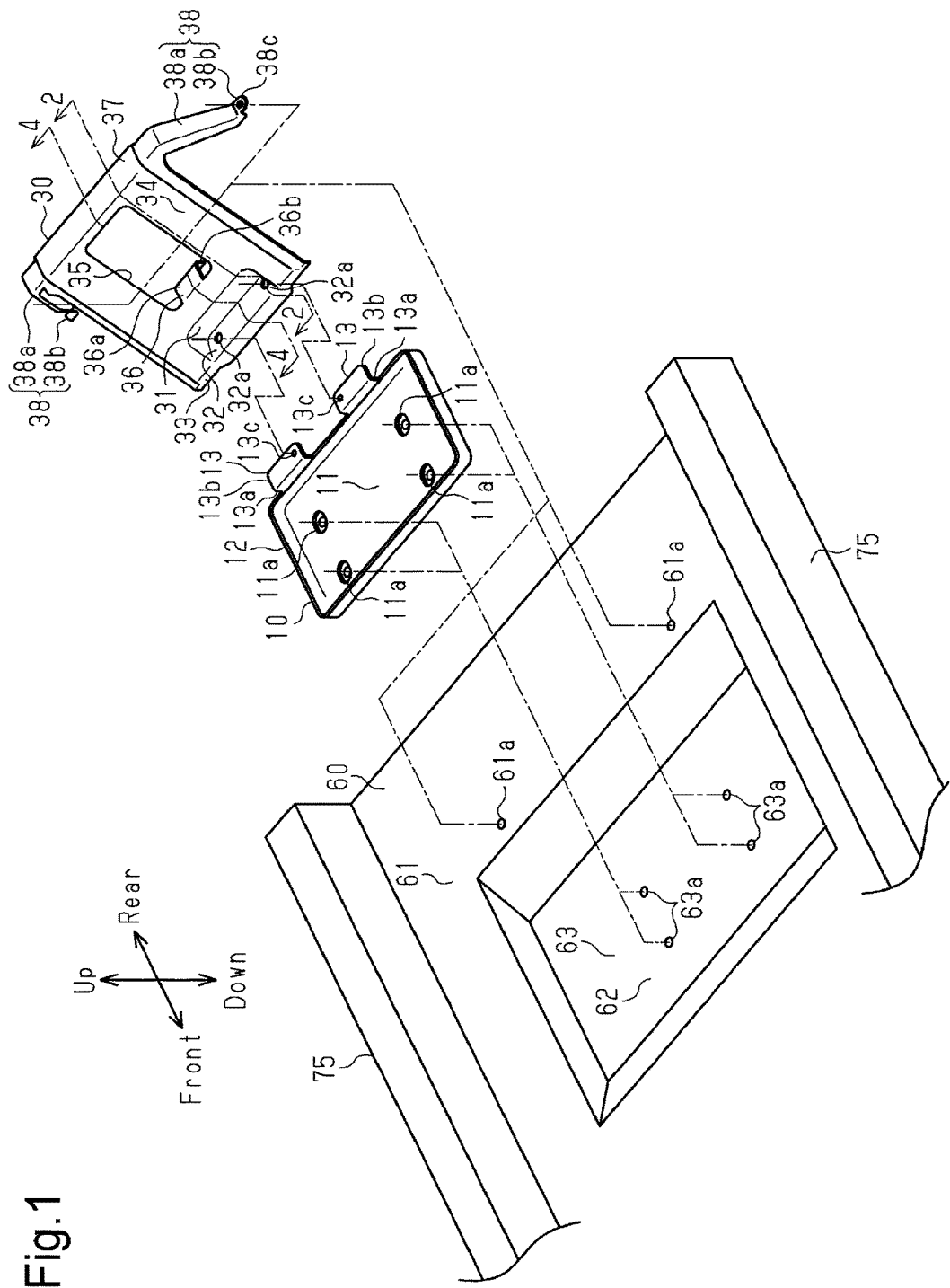
FIG. 1 is an exploded perspective view of a vehicle bottom structure.

As shown in FIG. 1, a pair of rear side members 75 spaced apart in the vehicle width direction is provided in the rear portion of a vehicle. Each of the rear side members 75 has a rectangular tubular shape as a whole and extends in the vehicle longitudinal direction. A plate-shaped rear floor panel 60 is arranged between the rear side members 75. The opposite edges in the vehicle width direction of the rear floor panel 60 are connected to the inner surfaces in the vehicle width direction of the rear side members 75. In the present embodiment, the rear floor panel 60 constitutes the floor surface of the luggage space in the rear portion of the vehicle.

The rear floor panel 60 includes an upper wall 61, which is a substantially flat portion, and an accommodating recess 62, which is located in a center portion in the vehicle width direction of the rear floor panel 60. The accommodating recess 62 is dented downward with respect to the upper wall 61. The accommodating recess 62 has a rectangular shape that is elongated in the vehicle width direction as a whole. A plurality of (four in the present embodiment) bolt holes 63a is provided in the bottom surface 63 of the accommodating recess 62. The upper wall 61 has two bolt holes 61a behind the accommodating recess 62. The bolt holes 61a are separated from each other in the vehicle width direction.

Figure 2:
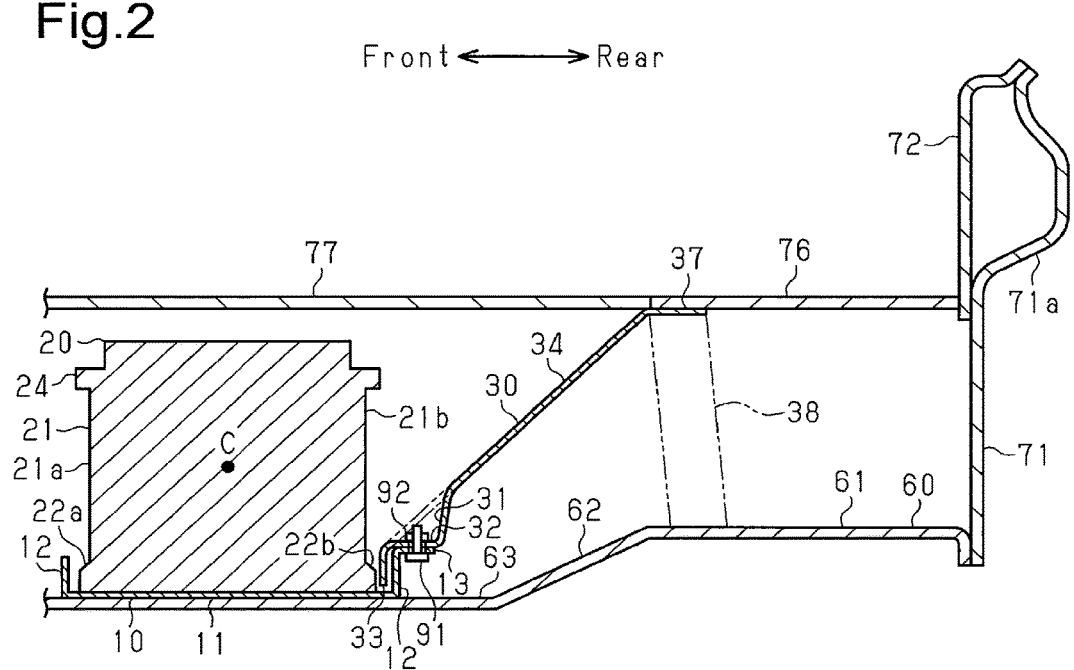
FIG. 2 is a cross-sectional view taken along line 2-2 in FIG. 1.
Figure 4:
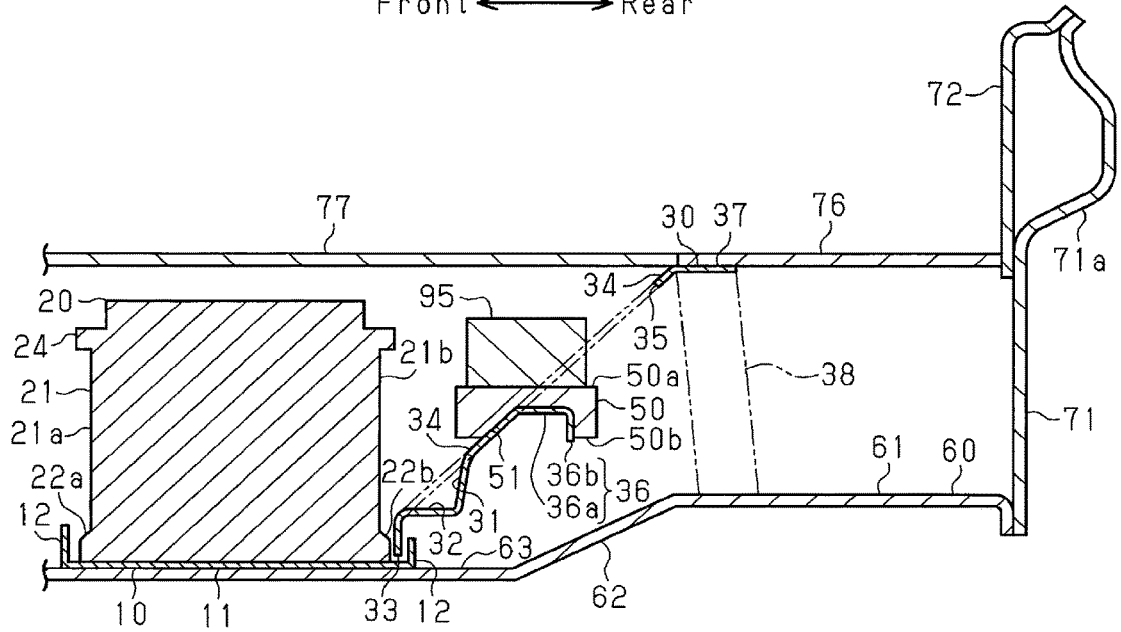
FIG. 4 is a cross-sectional view taken along line 4-4 in FIG. 1.

As shown in FIGS. 2 and 4, the rear end of the rear floor panel 60 is connected to the lower end of a plate-shaped lower back outer panel 71. The lower back outer panel 71 extends to a position above the rear side members 75. An upper portion 71a of the lower back outer panel 71 is curved to protrude rearward.

A plate-shaped lower back inner panel 72 is arranged on the front surface of the lower back outer panel 71 to face the upper portion 71a of the lower back outer panel 71. The upper end of the lower back inner panel 72 is fixed to the upper end of the lower back outer panel 71. The lower end of the lower back inner panel 72 is fixed to the part of the lower back outer panel 71 that is below the upper portion 71a.

As shown in FIG. 1, a battery holder 10 is attached to the bottom surface 63 of the accommodating recess 62 in the rear floor panel 60. The battery holder 10 has a rectangular plate-shaped carrier 11, which is elongated in the vehicle width direction. The carrier 11 has four bolt holes 11a extending therethrough in the thickness direction. Each bolt hole 11a has a stepped shape (so-called countersunk shape) so that the head of the bolt does not protrude above the upper surface of the carrier 11 when the bolt is inserted. The four bolt holes 11a are arranged so as to have the same positional relationship as the four bolt holes 63a of the accommodating recess 62 in the rear floor panel 60. Bolts (not shown) are inserted into the bolt holes 11a of the carrier 11 and the bolt holes 63a of the accommodating recess 62, so that the carrier 11 (the battery holder 10) is fixed to the bottom surface 63 of the accommodating recess 62. In the present embodiment, the bottom surface 63 of the accommodating recess 62 is a mounting surface for a battery 20 in the rear floor panel 60.

The battery holder 10 has a side portion 12 that protrudes upward from the outer peripheral edge of the carrier 11. The side portion 12 protrudes perpendicular to the carrier 11. The side portion 12 extends over the entire outer peripheral edge of the carrier 11. A pair of plate-shaped attachment tabs 13 is connected to the upper end of parts of the side portion 12 extending along the rear edge of the carrier 11. The attachment tabs 13 are separated from each other in the vehicle width direction. Each attachment tab 13 is constituted by a proximal portion 13a extending upward of the carrier 11 and a distal portion 13b extending rearward from the upper end of the proximal portion 13a. The attachment tab 13 thus has an L shape in cross section. The distal portion 13b of each attachment tab 13 extends in parallel to the bottom surface 63 of the accommodating recess 62. The distal portion 13b of each attachment tab 13 has a bolt hole 13c extending therethrough in the thickness direction.

As shown in FIGS. 2 and 4, the battery 20 is placed on the upper surface of the carrier 11 in the battery holder 10. That is, the battery 20 is mounted on the rear floor panel 60 via the battery holder 10. The battery 20 has a rectangular parallelepiped shape as a whole. The battery 20 includes a rectangular box-shaped battery main body 21, in which battery fluid and the like are stored. The battery main body 21 has four side surfaces including a front surface 21a. A forward extending front flange 22a is provided on the front surface 21a. The front flange 22a extends along the lower edge of the front surface 21a. The battery main body 21 also has a rear surface 21b on the rear side. A rear flange 22b protrudes rearward from the rear surface 21b. The rear flange 22b extends along the lower edge of the rear surface 21b. Similar flanges protrude from the left and right surfaces of the battery main body 21.

The battery 20 has a lid 24 located on top of the battery main body 21 to close the upper opening of the battery main body 21. The lid 24 is substantially shaped as a plate that is slightly larger than the battery main body 21 in the dimensions in the vehicle longitudinal direction and the vehicle width direction and covers the entire opening of the battery main body 21. The battery 20 is attached to the battery holder 10 by clamps (not shown).

Figure 3:
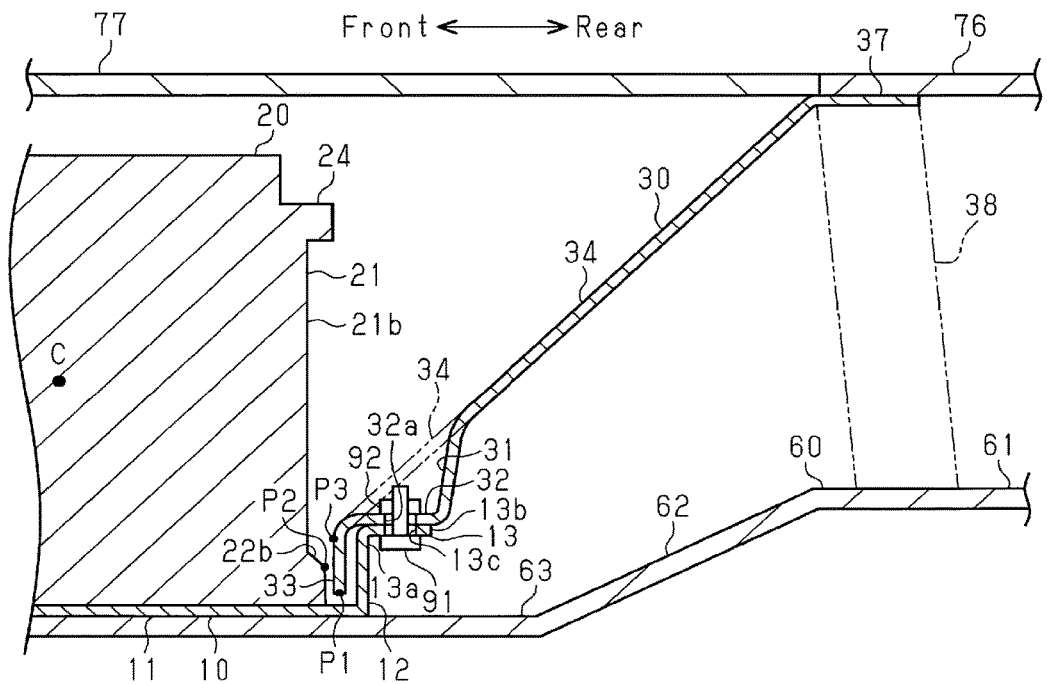
FIG. 3 is an enlarged partial view of the vehicle bottom structure shown in FIG. 2.

As shown in FIGS. 1 to 3, a guide member 30 is provided behind the battery 20 to be adjacent to the battery 20. The guide member 30 includes a plate-shaped inclined portion 34 for guiding the battery 20 when removing the battery 20. The inclined portion 34 is inclined such that, in a direction parallel with the bottom surface 63 of the accommodating recesses 62 (the left-right direction as viewed in FIGS. 2 and 3), the inclined portion 34 rises as the rearward distance from the battery 20 increases. In the present embodiment, a space is defined between the inclined portion 34 and the rear floor panel 60. In this space, other parts (not shown) are installed. Such other parts include an electronic control unit (ECU).

As shown in FIGS. 1 to 4, the guide member 30 includes a plate-shaped support portion 37 extending rearward from the rear end of the inclined portion 34. The support portion 37 is shaped as a rectangle elongated in the vehicle width direction, and its dimension in the vehicle width direction is the same as the inclined portion 34. Further, the support portion 37 extends in parallel with the bottom surface 63 of the rear floor panel 60.

As shown in FIG. 1, the guide member 30 includes a pair of legs 38 extending downward from the outer ends of the support portion 37 in the vehicle width direction. The legs 38 are each provided one of the sides in the vehicle width direction of the support portion 37. Each leg 38 includes a leg body 38a, which spreads outward in the vehicle width direction toward the lower end, and a rear fixing portion 38b, which extends outward in the vehicle width direction from the lower end of the leg body 38a. Each rear fixing portion 38b has a bolt hole 38c extending therethrough in the thickness direction. The distance between the bolt holes 38c of the legs 38 of the guide member 30 is the same as the distance between the bolt holes 61a of the upper wall 61. Bolts (not shown) are inserted through the bolt holes 61a of the upper wall 61 and the bolt holes 38c of the guide members 30. As a result, the legs 38 of the guide member 30 are fixed to the upper wall 61 of the rear floor panel 60, so that the inclined portion 34 and the support portion 37 are supported by the legs 38.

As shown in FIG. 1, the inclined portion 34 of the guide member 30 includes a front fixing portion 31 for fixing the guide member 30 to the distal portions 13b of the attachment tab 13 of the battery holder 10. The front fixing portion 31 is located in a lower part of the inclined portion 34 at the center in the vehicle width direction. The front fixing portion 31 has a shape recessed downward with respect to the upper surface of the inclined portion 34 and has a lower surface portion 32 that extends in parallel with the bottom surface 63 of the accommodating recess 62. The lower surface portion 32 includes a pair of bolt holes 32a extending therethrough in the thickness direction and separated from each other in the vehicle width direction. The distance between the bolt holes 32a is the same as the distance between the bolt holes 13c of the attachment tabs 13 of the battery holder 10. As shown in FIG. 3, a bolt 91 is inserted from below into each bolt hole 32a of the front fixing portion 31 and the bolt hole 13c of the corresponding attachment tab 13. A nut 92 is threaded onto the bolt 91 from above. Thereby, the front fixing portion 31 of the guide member 30 is fixed to the attachment tab 13 of the battery holder 10.

As shown in FIG. 3, the guide member 30 includes a plate-shaped tongue 33 extending downward from the front end of the inclined portion 34 (the front fixing portion 31). The tongue 33 is located between the rear flange 22b of the battery 20 and the side portion 12 of the battery holder 10. The tongue 33 extends perpendicular to the lower surface portion 32 of the front fixing portion 31. As a result, the tongue 33 is perpendicular to the bottom surface 63 of the accommodating recess 62. The lower end P1 of the tongue 33 is located below the upper end P2 of the distal end face of the rear flange 22b of the battery 20.

In the present embodiment, as shown in FIG. 3, nothing is located between the front end P3 of the inclined portion 34 (the front fixing portion 31) of the battery 20 and the rear surface 21b of the battery 20. Therefore, the battery 20 and the inclined portion 34 of the guide member 30 are adjacent to each other. Further, in the vehicle vertical direction, the position of the front end P3 of the inclined portion 34 (the front fixing portion 31) of the battery 20 is located above the lower surface of the battery 20 and below half the height of the battery 20. That is the position of the front end P3 is between the lower surface of the battery 20 and the position at half the height of the battery 20. The height of the battery 20 is referred to as the height from the lower surface of the battery 20 to the uppermost end of the lid 24 of the battery 20. In addition, in the present embodiment, the center of gravity C of the battery 20 is located at half the height of the battery 20.

As shown in FIGS. 1 and 4, the inclined portion 34 of the guide member 30 has an opening 35 extending therethrough in the thickness direction. The opening 35 has a rectangular shape and is located at substantially the center in the vehicle width direction of the inclined portion 34. A plate-shaped locking tab 36 extends from the lower edge of the opening 35. The locking tab 36 includes a flat portion 36a extending rearward from the lower edge of the opening 35 and a vertical portion 36b extending downward from the rear end of the flat portion 36a. The flat portion 36a provides a plane parallel to the bottom surface 63 of the rear floor panel 60. The vertical portion 36b is perpendicular to the flat portion 36a. The locking tab 36 does not protrude above the upper surface of the inclined portion 34.

As shown in FIG. 4, a placement table 50 is detachably attached to the edge of the opening 35 of the guide member 30. The placement table 50 has a rectangular parallelepiped shape that is elongated in the longitudinal direction of the vehicle as a whole. The dimension of the placement table 50 in the vehicle width direction is smaller than the dimension of the opening 35 in the vehicle width direction. The placement table 50 has a flat upper surface 50a. The placement table 50 has a lower surface 50b and a locking recess 51, which is dented upward from the lower surface 50b. The locking recess 51 is dented over the entire dimension in the vehicle width direction. The locking recess 51 has a shape conforming to the inclined shape of the inclined portion 34 of the guide member 30 and the shape of the locking tab 36. By fitting the lower edge of the opening 35 and the locking tab 36 of the guide member 30 into the locking recess 51 of the placement table 50, the placement table 50 is attached to the edge of the opening 35 of the guide member 30. The placement table 50 is attached to the edge of the opening 35 such that the upper surface 50a is a plane parallel to the bottom surface 63 of the rear floor panel 60. An article 95 is placed on the upper surface 50a of the placement table 50. The article 95 may be a jack.

As shown in FIG. 2, a plate-shaped deck board 76 is arranged on the upper surface of the support portion 37 of the guide member 30. The center portion in the vehicle width direction of the front end of the deck board 76 is supported by the support portion 37 of the guide member 30. The thickness of the deck board 76 is about a few millimeters to a few centimeters. A battery cover 77 for covering the battery 20 is arranged in front of the deck board 76. The battery cover 77 has the same thickness as the deck board 76. The battery cover 77 and the deck board 76 cover substantially the entire upper side of the rear floor panel 60.

Figure 6:
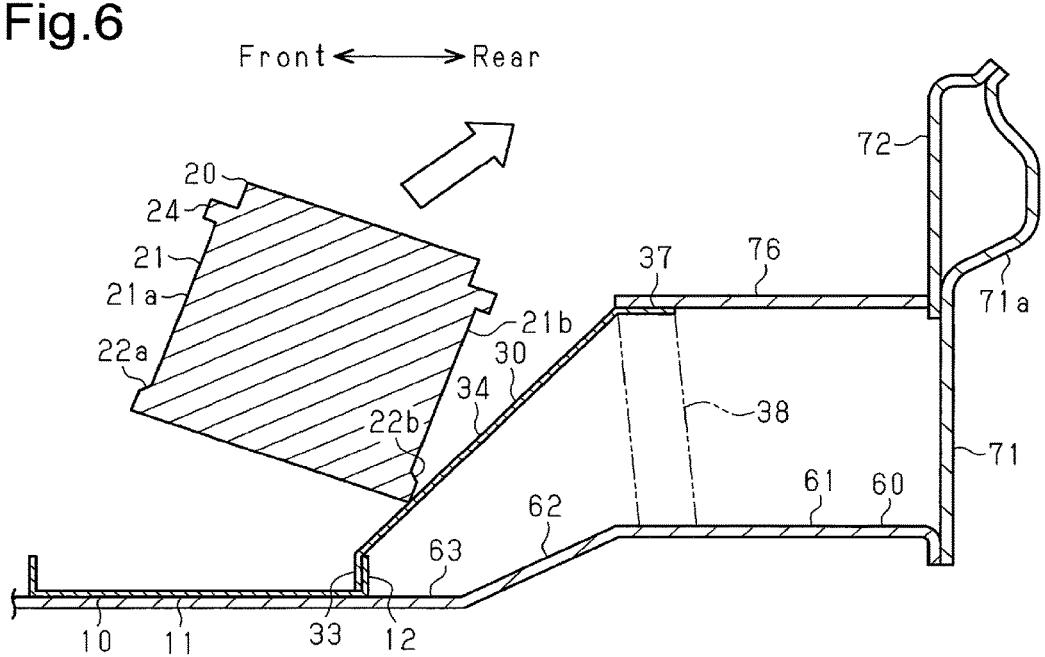
FIG. 6 is an explanatory diagram showing the method for removing the battery.
Figure 7:
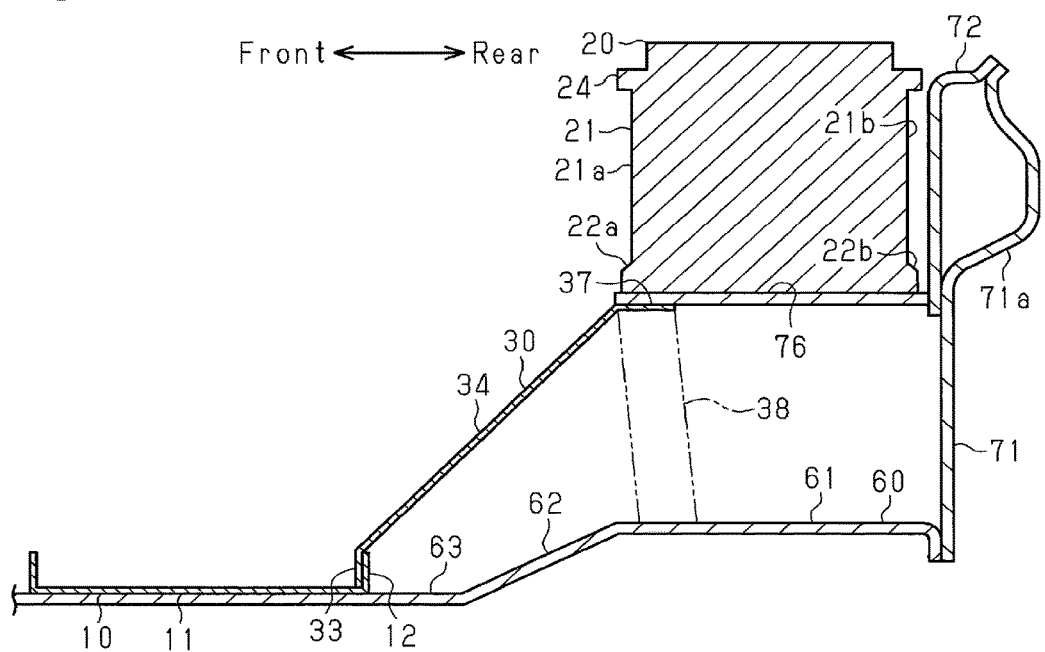
FIG. 7 is an explanatory diagram showing the method for removing the battery.

Next, with reference to FIGS. 5 to 7, a method for removing the battery 20 from the vehicle bottom structure of the above embodiment will be described.

Figure 5:
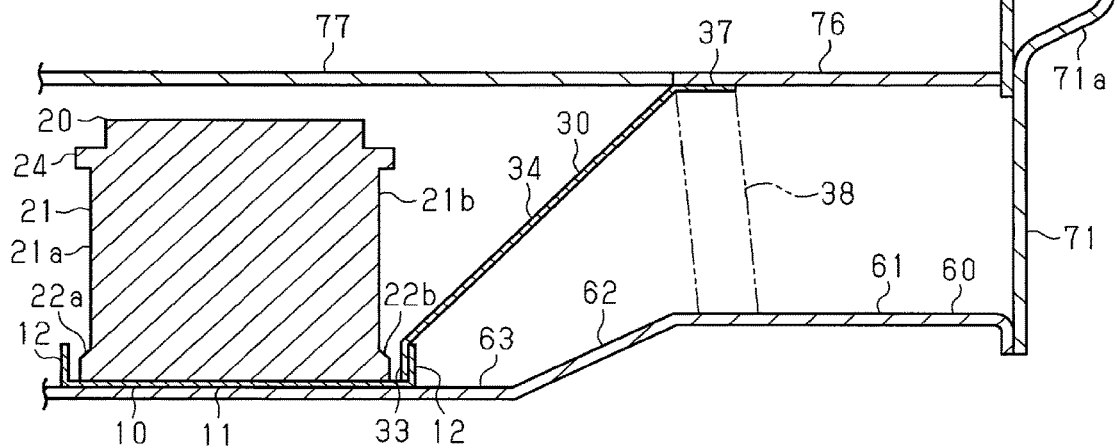
FIG. 5 is an explanatory diagram showing the method for removing the battery.

As shown in FIG. 5, the battery cover 77 is placed above the battery 20 to cover the battery 20. Thus, the operator first removes the battery cover 77. Also, the operator removes the article 95 and the placement table 50 from the inclined portion 34 of the guide member 30. As a result, the upper sides of the battery 20 and the guide member 30 are exposed, and there is no obstacle above the inclined portion 34 of the guide member 30. Then, the operator removes the clamps, which fasten the battery 20 to the battery holder 10.

Next, the operator grasps the battery 20 and slides it rearward on the carrier 11 of the battery holder 10. This causes the rear flange 22b of the battery 20 to abut against the tongue 33 of the guide member 30. An attempt to slide the battery 20 further rearward tilts the battery 20 rearward (toward the inclined portion 34), so that the rear surface 21b of the battery 20 contacts the front end P3 of the inclined portion 34 of the guide member 30. Thereafter, an attempt to move the battery 20 rearward tilts the battery 20 rearward (toward the inclined portion 34) with the contact portion serving as a fulcrum. In this state, the operator further pulls up the battery 20 rearward and obliquely upward. Then, as shown in FIG. 6, the battery 20 is moved upward on the inclined portion 34 while the rear flange 22b of the battery 20 slides on the tongue 33 of the guide member 30. Further, the battery 20 is lifted rearward while being slid along the inclined portion 34 of the guide member 30.

When the battery 20 is pulled up to the vicinity of the upper end of the inclined portion 34 of the guide member 30, for example, the rear flange 22b of the battery 20 comes into contact with the front end of the deck board 76. Therefore, the operator lifts the battery 20 by the amount corresponding to the thickness of the deck board 76 (a few millimeters to a few centimeters) and temporarily places the battery 20 on the deck board 76 as shown in FIG. 7. Thereafter, as necessary, the operator carries the battery 20 out of the vehicle.

The above-described embodiment achieves the following advantages.

As described above, in the vehicle bottom structure of the above-described embodiment, the battery 20 is mounted on the bottom surface 63 of the accommodating recess 62 of the rear floor panel 60. Such arrangement of the battery 20, which has a considerable weight, in the lower part of the vehicle is favorable from the viewpoint of improvement in the vehicle mobility due to the low center of gravity of the vehicle. On the other hand, lifting the battery 20 up to the deck board 76 to remove the battery 20 places a considerable physical burden on the operator. Furthermore, if the battery 20 is mounted on the front portion of the rear floor panel 60, the operator needs to reach a hand from behind the vehicle to grasp the battery 20, which is likely to increase the physical burden on the operator.

In this regard, according to the above-described embodiment, the battery 20 can be tilted toward the inclined portion 34 by bringing the battery 20 into abutment against the front end P3 of the inclined portion 34 of the guide member 30 without lifting the battery 20. At this time, the front end P3 of the inclined portion 34 is brought into contact with the part of the battery 20 that is below half the height of the battery 20. In the above-described embodiment, since the center of gravity C of the battery 20 is located at half the height of the battery 20, the battery 20 can be tilted toward the inclined portion 34 with a relatively small force. Then, by pulling up the battery 20 while causing it to slide on the inclined portion 34 of the guide member 30, the physical burden on the operator is reduced as compared with a case where the battery 20 is taken out by lifting the battery 20 right above, for example.

Further, by pulling up the battery 20 while causing it to slide in this manner, for example, the battery 20 is less likely to interfere with peripheral components (not shown) in the process of removal of the battery 20 performed by the operator. Thus, it is possible to restrain the battery 20 and the peripheral components from being damaged due to interference between the battery 20 and the peripheral components.

Further, in the above-described embodiment, the guide member 30 has the support portion 37 extending from the upper end of the support portion 37, and the deck board 76 is placed on the support portion 37. That is, the upper end of the inclined portion 34 reaches substantially the same height as the deck board 76. This allows the battery 20 to be pulled up to substantially the same position as the deck board 76 while causing it to slide the upper surface of the inclined portion 34. Then, after the operator has lifted the battery 20 to the upper end of the inclined portion 34, the battery 20 can be temporarily placed on the deck board 76. Further, in the above-described embodiment, the legs 38 extend from the support portion 37 of the guide member 30. Therefore, when the battery 20 is temporarily placed on the deck board 76 and the weight of the battery 20 acts on the support portion 37 of the guide member 30 via the deck board 76, the weight is reliably borne by the legs 38.

A step corresponding to the thickness of the deck board 76 may exist between the upper end of the inclined portion 34 and the upper surface of the deck board 76. Nonetheless, the deck board 76 generally has a thickness of a few millimeters to a few centimeters at most. A step of such a dimension will not impose a heavy physical burden on the operator when lifting the battery 20 and temporarily placing it on the deck board 76.

In the above-described embodiment, the rear flange 22b protrudes from the rear surface 21b of the battery 20. Also, the guide member 30 has the tongue 33, which is located between the side portion 12 of the battery holder 10 and the rear flange 22b of the battery 20. In such a positional relationship, when the battery 20 is moved rearward, the rear flange 22b of the battery 20 can enter between the lower end P1 of the tongue 33 of the guide member 30 and the carrier 11 of the battery holder 10. If such a situation occurs, there is a possibility that the rear flange 22b of the battery 20 and the tongue 33 of the guide member 30 will be damaged. In this respect, in the above-described embodiment, the lower end P1 of the tongue 33 is located below the upper end P2 of the distal end face of the rear flange 22b of the battery 20. Therefore, the rear flange 22b of the battery 20 is unlikely to enter between the lower end P1 of the tongue 33 and the carrier 11 of the battery holder 10.

The guide member 30 of the above-described embodiment is fixed to the battery holder 10 and the rear floor panel 60 with bolts, so that removable of the guide member 30 is by no means easy. However, in the above-described embodiment, the guide member 30 has the opening 35 in the inclined portion 34. Therefore, the space between the inclined portion 34 of the guide member 30 and the rear floor panel 60 can be accessed via the opening 35 of the inclined portion 34. Therefore, even though the guide member 30 is fixed to the rear floor panel 60 with bolts, it is possible to install components such as an ECU in the space between the inclined portion 34 and the rear floor panel 60 and perform maintenance of such components.

The inclined portion 34 of the guide member 30 of the above-described embodiment is inclined. Thus, even if an article is placed on the upper surface of the inclined portion 34, the article is displaced downward according to the inclination of the inclined portion 34 and thus unstable. In other words, it is difficult to use the space above the inclined portion 34 as a storage space for articles. In this regard, in the present embodiment, the placement table 50 is attached to the edge of the opening 35 of the guide member 30. When the placement table 50 is attached to the edge of the opening 35, the upper surface 50a is a plane parallel to the bottom surface 63 of the rear floor panel 60. Thereby, the upper surface 50a of the placement table 50 can be used as a surface to place the article 95. This allows the space above the inclined portion 34 to be effectively utilized. In addition, the locking tab 36, which extends from the opening 35 of the inclined portion 34, attaches the placement table 50 to the edge of the opening 35. Thus, as compared with a configuration in which the placement table 50 is merely attached to the edge of the opening 35, the mounting state of the placement table 50 on the edge of the opening 35 is stabilized.

The placement table 50 is not fixed to the edge of the opening 35 with fasteners such as bolts, but is detachable. Thus, if the placement table 50 and the article 95 placed thereon have been removed, the placement table 50 will not obstruct sliding motion of the battery 20 on the inclined portion 34 of the guide member 30 when the battery 20 is removed.

The above-described embodiment may be modified as follows.

In the above-described embodiment, the rear fixing portion 38b of the guide member 30 is fixed to the rear floor panel 60 with bolts, but the manner of fixing the rear fixing portion 38b is not limited. For example, the rear fixing portion 38b of the guide member 30 may be fixed to the rear floor panel 60 by welding or the like.

In the above-described embodiment, the guide member 30 is fixed to the rear floor panel 60, but the guide member 30 may be detachable from the rear floor panel 60. In the normal use of the vehicle, in which the battery 20 is not removed, the guide member 30 may be detached. At the time of maintenance of the vehicle, which requires removal of the battery 20, the guide member 30 may be installed. In this modification, the state in which the guide member 30 is attached to the rear floor panel 60 at the time of vehicle maintenance or the like corresponds to the vehicle bottom structure provided with the inclined portion 34 for guiding the battery 20 when removing the battery 20.

In the case where the guide member 30 is configured to be detachable from the rear floor panel 60, the legs 38 of the guide member 30 may be omitted as long as the inclined portion 34 is supported to rise toward the rear end. For example, the inclined portion 34 may be placed such that the front end of the plate-shaped inclined portion 34 is brought into contact with the rear end of the battery holder 10, and the rear end of the inclined portion 34 is placed on the front end of the deck board 76.

In the above-described embodiment, the guide member 30 includes the inclined portion 34, but the guide member 30 may be omitted, and another member may include an inclined portion. For example, a component may be arranged behind the accommodating recess 62 in the rear floor panel 60, and the housing of the component has an inclined portion that rises toward the rear end. Further, for example, the rear floor panel 60 may include an inclined portion that is located behind the accommodating recess 62 and rises toward the rear end.

In the above-described embodiment, the guide member 30 is arranged behind the battery 20, and the inclined portion 34 of the guide member 30 is inclined to rise toward the rear end. However, the present invention is not limited thereto. For example, the guide member 30 may be arranged on the outer side of the battery 20 in the vehicle width direction, and the inclined portion 34 of the guide member 30 may be inclined to rise toward the outer end in the vehicle width direction. That is, the position of the battery 20 and the direction in which the battery 20 is removed may be changed as necessary as long as the guide member 30 is arranged adjacent to the battery 20 and the inclined portion 34 is inclined to rise as the distance from the battery 20 increases.

In the above-described embodiment, the opening 35 is provided in the inclined portion 34 of the guide member 30. However, the opening 35 may be omitted. For example, if components arranged between the inclined portion 34 and the rear floor panel 60 do not require frequent maintenance, there will be few adverse effects if the inclined portion 34 of the guide member 30 does not have the opening 35, and the components cannot be accessed.

The locking tab 36 extends from the lower edge of the opening 35 in the above-described embodiment. However, a locking tab may extend from the upper edge of the opening 35. Alternatively, a locking tab may extend from an edge on the outer side in the vehicle width direction of the opening 35. In any case, it is necessary to prevent the locking tab from protruding further upward than the upper surface of the inclined portion 34.

In the above-described embodiment, the guide member 30 includes the locking tab 36. However, the locking tab 36 may be omitted as long as the placement table 50 can be attached to the opening 35. For example, a slit may be provided in the lower surface 50b of the placement table 50, and the edge of the opening 35 of the inclined portion 34 may be fitted to the slit. In this case, the placement table 50 can be attached to the edge of the opening 35 without the locking tab 36.

In the above-described embodiment, the upper surface 50a of the placement table 50 is flat, but the present invention is not limited thereto. For example, the state of the upper surface 50a of the placement table 50 may be changed as necessary in accordance with the shape of the articled 95 placed thereon.

In the above-illustrated embodiment, the guide member 30 includes the support portion 37, but the support portion 37 may be omitted. In this case, the deck board 76 is preferably supported by a member other than the guide member 30, and the deck board 76 preferably has substantially the same height as the upper end of the inclined portion 34 of the guide member 30.

In the above-described embodiment, the front end of the deck board 76 is supported by the support portion 37 of the guide member 30 even when the battery 20 is removed, but the invention is not limited thereto. For example, the deck board 76 and the battery cover 77 may be made of a single integral board. In this case, when removing the battery 20, the deck board 76 is not placed on the upper surface of the support portion 37. Even in this case, the operator can pull up the battery 20 to the upper end of the inclined portion 34 and temporarily place the battery 20 directly on the upper surface of the support portion 37.

In the above-described embodiment, the lower end P1 of the tongue 33 of the guide member 30 is located below the upper end P2 of the distal end face of the rear flange 22b of the battery 20, but the invention is not limited thereto. For example, the position of the lower end P1 of the tongue 33 can be appropriately changed if the battery 20 does not have the rear flange 22b.

In the above-described embodiment, the battery 20 is removed while the battery holder 10 remains fixed to the rear floor panel 60, but the battery 20 may be removed together with the battery holder 10. In this case, for example, instead of fixing the battery holder 10 to the rear floor panel 60 with bolts, the battery holder 10 is preferably fixed with clamps so as to be manually removable from the rear floor panel 60, without using a jig.

In the above-described embodiment, the battery 20 is arranged in the accommodating recess 62 of the rear floor panel 60, but the accommodating recess 62 may be omitted. Also, the battery 20 does not necessarily needs to be mounted on the rear floor panel 60, but may be mounted on the front floor panel, which is located in front of the rear floor panel 60. The technology related to the guide member 30 (the inclined portion 34) of the above-described embodiment may be applied to any configuration as long as the battery 20 is mounted on a member that is referred to as a floor panel and the deck board 76 is located above the floor panel.

In the above-described embodiment, the battery 20 is mounted on the rear floor panel 60 via the battery holder 10, but the invention is not limited thereto. For example, the battery 20 may be directly mounted on the rear floor panel 60.

In the above-described embodiment, the center of gravity C of the battery 20 is located at half the height of the battery 20. However, depending on the type of the battery 20, the center of gravity C may be located above or below half the height of the battery 20. Nonetheless, the center of gravity C of the battery 20 is ought to be located close to half the height of the battery 20. Thus, when the front end P3 of the inclined portion 34 of the guide member 30 is located above the lower surface of the battery 20 and below half the height of the battery 20, the battery 20 can be tilted toward the inclined portion 34 by being brought into abutment against the inclined portion 34.

The invention claimed is:

1. A vehicle bottom structure comprising:
    a floor panel, which constitutes a floor surface of a vehicle and has a mounting surface on which a battery is mounted;
    a battery mounted on the mounting surface of the floor panel;
    a plate-shaped deck board, which is located above the floor panel and the battery; and
    an inclined portion, which is arranged adjacent to the battery and guides the battery when the battery is removed, wherein
    the inclined portion is inclined such that, in a direction parallel to the mounting surface of the floor panel, the inclined portion rises as a distance from the battery increases, and
    the inclined portion includes an end facing the battery, wherein the end is located above a lower surface of the battery and below half a height of the battery.

2. The vehicle bottom structure according to claim 1, wherein
    the inclined portion is shaped like a plate that is arranged such that a space is defined between the inclined portion and the floor panel,
    the inclined portion is part of a guide member that is arranged adjacent to the battery,
    the guide member includes a leg that supports the inclined portion, wherein a lower end of the leg is fixed to the floor panel, and
    the inclined portion includes an opening extending therethrough in a thickness direction of the inclined portion.

3. The vehicle bottom structure according to claim 2, further comprising a placement table, which is detachably attached to an edge of the opening,
    wherein the placement table includes an upper surface, which is a plane parallel to the mounting surface when the placement table is attached to the edge of the opening.

4. The vehicle bottom structure according to claim 2, wherein
    the guide member includes a plate-shaped support portion, which extends from an upper end of the inclined portion and away from the battery in the direction parallel to the mounting surface of the floor panel, and
    the deck board is arranged on an upper surface of the support portion.

5. The vehicle bottom structure according to claim 2, wherein
    a battery holder, on which the battery is mounted, is provided on the mounting surface, the battery holder includes
- a plate-shaped carrier, on which the battery is mounted, and
- a side portion, which protrudes upward from an outer peripheral edge of the carrier, the battery includes
- a rectangular box-shaped battery main body, and
- a flange, which protrudes outward from one of four side surfaces of the battery main body that faces the inclined portion, the flange extending along a lower edge of the side surface, the guide member includes a tongue, which extends downward from the end of the inclined portion, the tongue is located between the flange and the side portion, and a lower end of the tongue is located below an upper end of a distal end face of the flange.

\* \* \* \* \*